(12) United States Patent
Lillard

(10) Patent No.: US 9,099,065 B2
(45) Date of Patent: Aug. 4, 2015

(54) SYSTEM AND METHOD FOR TEACHING AND PLAYING A MUSICAL INSTRUMENT

(71) Applicant: Justin Lillard, Cleveland, OH (US)

(72) Inventor: Justin Lillard, Cleveland, OH (US)

( * ) Notice: Subject to any disclaimer, the term of this patent is extended or adjusted under 35 U.S.C. 154(b) by 0 days.

(21) Appl. No.: 13/832,143

(22) Filed: Mar. 15, 2013

(65) Prior Publication Data

US 2014/0260905 A1    Sep. 18, 2014

(51) Int. Cl.
*G10H 1/32* (2006.01)
*G10H 1/00* (2006.01)
*G09B 15/00* (2006.01)
*G09B 15/04* (2006.01)

(52) U.S. Cl.
CPC .............. *G10H 1/0016* (2013.01); *G09B 15/00* (2013.01); *G09B 15/002* (2013.01); *G09B 15/04* (2013.01); *G10H 1/32* (2013.01); *G10H 2220/021* (2013.01); *G10H 2220/046* (2013.01); *G10H 2220/081* (2013.01)

(58) Field of Classification Search
USPC ................ 84/600–602, 609, 649, 477 R, 646
IPC .............. G10H 1/32,1/0016, 1/0008, 2220/021, G10H 2220/046, 2220/081
See application file for complete search history.

(56) References Cited

U.S. PATENT DOCUMENTS

| | | | | |
|---|---|---|---|---|
| 3,247,307 A * | 4/1966 | Campbell, Jr. | ................... | 84/713 |
| 3,379,087 A * | 4/1968 | Weitzner | ........................ | 84/478 |
| 3,406,604 A * | 10/1968 | Stickley et al. | ................ | 84/484 |
| 4,128,037 A | 12/1978 | Montemurro | | |
| 4,207,087 A | 6/1980 | Morrison | | |
| 4,359,220 A | 11/1982 | Morrison et al. | | |
| 4,516,465 A * | 5/1985 | Kani | ........................... | 84/470 R |
| 4,730,533 A * | 3/1988 | Schoerkmayr | .................. | 84/478 |
| 4,741,242 A | 5/1988 | Aronstein | | |
| 4,790,230 A * | 12/1988 | Sanderson | ...................... | 84/462 |
| 5,138,928 A | 8/1992 | Nakajima et al. | | |
| 5,214,231 A * | 5/1993 | Ernst et al. | ..................... | 84/652 |
| 5,392,682 A * | 2/1995 | McCartney-Hoy | ......... | 84/470 R |
| 5,394,784 A * | 3/1995 | Pierce et al. | ................ | 84/464 A |
| 5,574,238 A * | 11/1996 | Mencher | ...................... | 84/483.2 |
| 5,656,789 A * | 8/1997 | Nakada et al. | .............. | 84/477 R |
| 5,783,764 A * | 7/1998 | Amar | .......................... | 84/479 A |
| 5,827,988 A * | 10/1998 | Wachi | ............................ | 84/609 |
| 5,855,513 A | 1/1999 | Lam | | |
| 5,907,115 A * | 5/1999 | Matsunaga et al. | ......... | 84/477 R |
| 5,922,981 A | 7/1999 | Ballister | | |
| 6,087,577 A * | 7/2000 | Yahata et al. | ................... | 84/478 |
| 6,107,559 A * | 8/2000 | Weinstock et al. | ............ | 84/634 |
| 6,337,433 B1 * | 1/2002 | Nishimoto | ................... | 84/464 A |
| 6,365,814 B1 * | 4/2002 | Matsuda | ...................... | 84/477 R |
| 6,372,973 B1 | 4/2002 | Schneider | | |
| 6,410,836 B2 * | 6/2002 | Takahashi | ....................... | 84/478 |
| 6,586,666 B2 | 7/2003 | Abe | | |
| 6,716,031 B2 | 4/2004 | Wood et al. | | |
| 7,060,887 B2 * | 6/2006 | Pangrle | .......................... | 84/724 |
| 7,220,907 B2 * | 5/2007 | McIntosh | .................... | 84/477 R |
| 7,351,148 B1 | 4/2008 | Rothschild et al. | | |

(Continued)

*Primary Examiner* — David Warren
(74) *Attorney, Agent, or Firm* — Renner, Otto, Boisselle & Sklar, LLP

(57) ABSTRACT

A tool for teaching the playing of a musical instrument includes a control and a signaling unit that instruct a student as to the proper time to strike an instrument. The control is configured to provide a series of signals, through the signaling unit, that denote a tempo for music or a beat, a warning that the time to strike the instrument is approaching, and a signal when it is time to strike the instrument in accordance with the beat or music.

13 Claims, 4 Drawing Sheets

(56) References Cited

U.S. PATENT DOCUMENTS

| | | | |
|---|---|---|---|
| 7,351,898 B2 | 4/2008 | Sagastegui | |
| 7,358,432 B2* | 4/2008 | Risley | 84/470 R |
| 7,507,893 B2* | 3/2009 | Knudsen | 84/470 R |
| 7,547,840 B2 | 6/2009 | Noh et al. | |
| 7,608,774 B2* | 10/2009 | Ohmura et al. | 84/470 R |
| 7,629,527 B2* | 12/2009 | Hiner et al. | 84/470 R |
| 7,674,964 B2* | 3/2010 | Ohmura et al. | 84/478 |
| 7,718,884 B2* | 5/2010 | Jessop | 84/615 |
| 8,119,898 B2* | 2/2012 | Bentson | 84/609 |
| 8,487,174 B2* | 7/2013 | Bentson | 84/609 |
| 8,525,011 B2* | 9/2013 | Ihara | 84/478 |
| 2002/0134216 A1* | 9/2002 | Shibukawa | 84/477 R |
| 2002/0177113 A1* | 11/2002 | Sherlock | 434/308 |
| 2005/0241459 A1* | 11/2005 | Risley | 84/464 A |
| 2006/0207411 A1* | 9/2006 | Ohmura et al. | 84/600 |
| 2007/0150082 A1* | 6/2007 | Yang et al. | 700/94 |
| 2008/0295673 A1 | 12/2008 | Noh et al. | |
| 2010/0016079 A1* | 1/2010 | Jessop | 463/39 |
| 2010/0309136 A1* | 12/2010 | Liu et al. | 345/169 |
| 2011/0030533 A1* | 2/2011 | Piccionelli et al. | 84/422.4 |
| 2012/0234160 A1* | 9/2012 | Khoo et al. | 84/660 |

* cited by examiner

SYSTEM AND METHOD FOR TEACHING AND PLAYING A MUSICAL INSTRUMENT

FIELD OF THE INVENTION

This invention relates generally to a system and method for teaching the playing of one or more percussive instruments wherein the system signals a student as to the proper time to strike the instrument.

BACKGROUND OF THE INVENTION

Conventionally, a student wishing to learn how to play a musical instrument, for example the drums, must hire a teacher. Students pursuing self-instruction can only learn by watching videos or reading books. But unlike having a teacher, videos and books provide little real-time guidance and, more importantly, provide no feedback on the student's progress. Though the prior art contains some games aimed at teaching rhythm, these games are unassociated with the instrument itself and do not teach a student to play on the actual instrument. This presents a large learning curve for students wishing to take the leap from a simple rhythmic game to actual mastery of an instrument.

SUMMARY OF THE INVENTION

The invention is a system and method for teaching the playing of a musical instrument, for example, one or more percussive instruments in coordination with music or a beat. One aspect includes teaching a student how to recognize a beat and when to strike a drum, cymbal, or other percussive instrument to properly play the music. Although the invention is described with respect to a percussion instrument, for example one or more drums, it may also be used with other instruments such as, for example, a piano, a guitar, and so on.

An aspect of the invention relates to a system facilitating playing of an instrument, including a signaling unit configured to indicate timing for applying an input to the instrument, a control configured to operate the signaling unit to indicate such timing according to a beat, the signaling unit comprising an indicator operable in response to the control to provide indications of both time to apply the input and a warning preceding time to apply the input.

According to another aspect the input includes striking a percussion instrument.

According to another aspect the system includes a plurality of signaling units.

According to another aspect, the control includes a display for displaying music and instructive videos, and for allowing user interactivity with the control, a plurality of selectors facilitating user interactivity, a sensing or recording device, a memory, and an input/output.

According to another aspect, the signaling unit includes a plurality of indicators.

According to another aspect, the signaling unit further includes a trigger, sensor, or other input for sensing a percussive strike.

According to another aspect, a flexible material for bending around the rim of drum and 'C'-shaped bottom member facilitates a secure fit to a drumhead.

According to another aspect, the control is connected to a general purpose computer.

According to another aspect, the plurality of signaling units are connected to the control through a wireless connection.

Another aspect relates to a method for teaching the playing of a musical instrument including the steps of:

generating a first output to a signaling unit representing the tempo of a beat or music, generating a second output to said signaling unit warning the student that the time to apply an input to the instrument is approaching, generating a third output to the signaling unit conveying the precise time to apply an input to the instrument.

According to another aspect, the includes striking a percussion instrument

According to another aspect, the signaling unit:

sensing a percussive strike, decoding the sound of the strike via decoding circuitry, storing the sound into a sequence of beats in a memory, and playing back said sequence of beats from said memory.

According to another aspect, the first, second, and third outputs are sent to a plurality of signalizing units.

According to another aspect, each of the plurality of signaling units:

sensing a percussive strike, decoding the sound of said strike via decoding circuitry means, storing said sound into a sequence of beats in a memory, and playing back said sequence of beats from said memory.

According to another aspect, the second output further notifying the student of the preferred hand with which to strike.

These and other aspects and features may be carried out using the system and method including one or more signaling units and a control that indicate to the student a beat, a warning when the time to apply an input to the instrument is near, and a warning when it is time to apply the input. For example, one type of input to play an instrument is striking a drum. Another example is pressing a piano key. Still another example is finger placement and strumming on a guitar, and so on. The system and method may further include features such as a display, interactive controls, sensors and recording devices, memory, and other input/output mechanisms. For drums, the system's signaling units may include a flexible material for easy fitting to a drumhead. The system may also include a general-purpose computer and wireless connections.

This and other features of the present invention will become apparent with reference to the following description and attached drawings. In the description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the spirit and terms of the claims appended hereto.

Features that are described and/or illustrated with respect to one embodiment may be used in the same way or in a similar way in one or more other embodiments and/or in combination with or instead of the features of the other embodiments.

It should be emphasized that the term "comprise/comprising" when used in this specification is taken to specify the presence of stated features, integers, steps or components but does not preclude the presence or addition of one or more other features, integers, steps, components or groups thereof.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Likewise, elements and features depicted in one drawing may be combined with elements and features depicted in additional drawings. Moreover, in the drawings, like reference numerals designate corresponding parts throughout the several views.

DETAILED DESCRIPTION OF THE INVENTION

Figure 1:
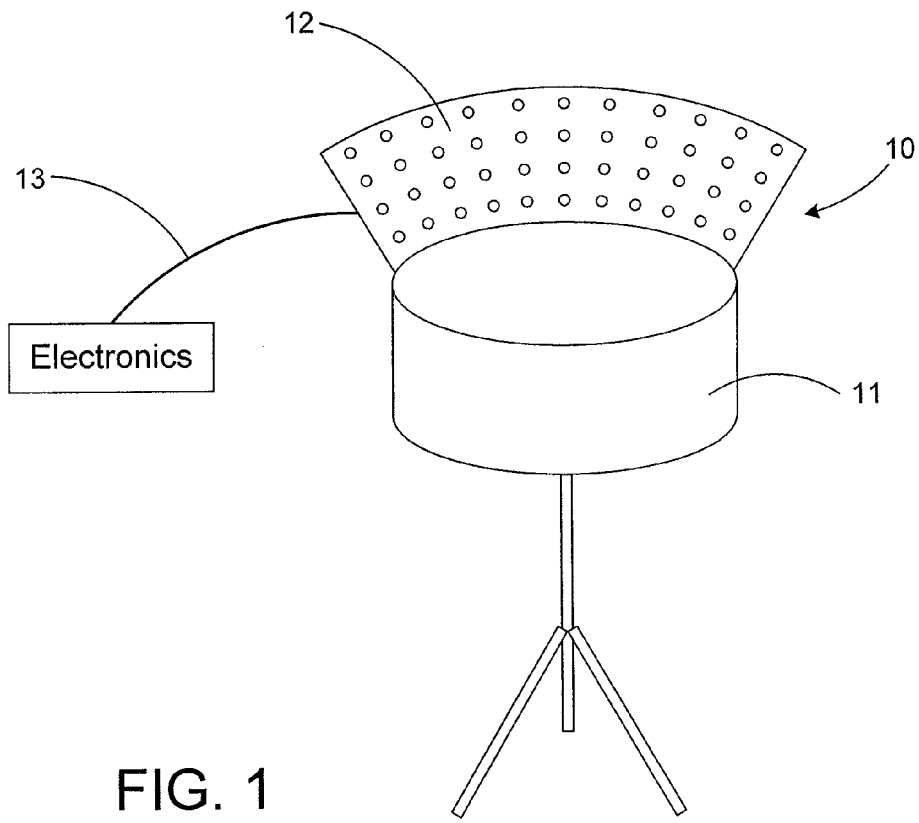
FIG. 1 is a schematic illustration of a tool for teaching the playing of one or more musical instruments.

Referring to the drawings, FIG. 1 illustrates a tool 10 as an apparatus according to an example of an embodiment of the invention and for use in carrying out the methods of the invention, for teaching the playing of one or more musical instruments, for example a drum 11. As mentioned above, the tool may be used with other musical instruments, for example a piano, guitar, and so on. Briefly, the tool 10 includes signaling unit 12 and electronics 13. As an example, the signaling unit 12 may include one or more lamps, or other device that provides a perceivable signal or information. The electronics 13 controls operation of the signaling unit 12, for example as described further below, to provide information to a user for playing the musical instrument in real time.

Figure 2:
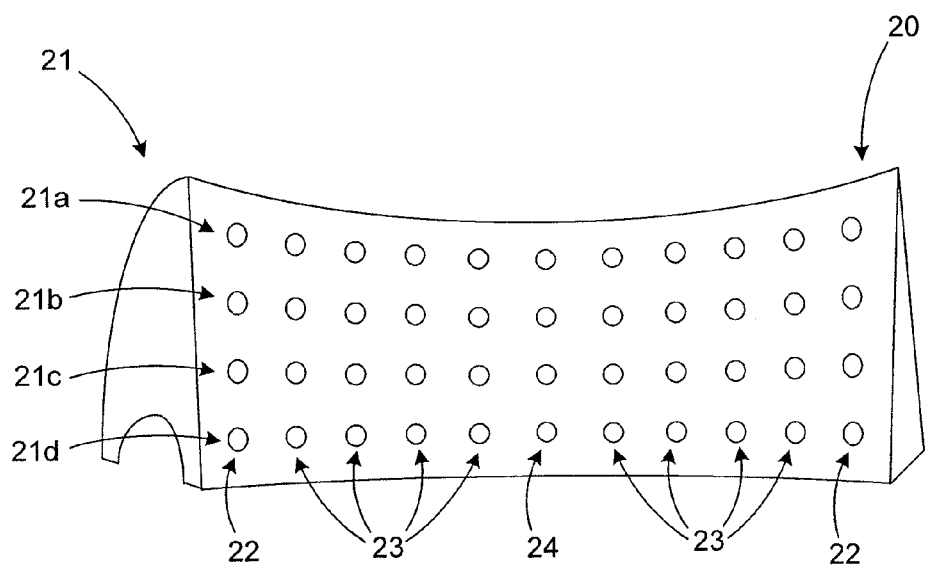
FIG. 2 illustrates an exemplary signaling unit.
Figure 3:
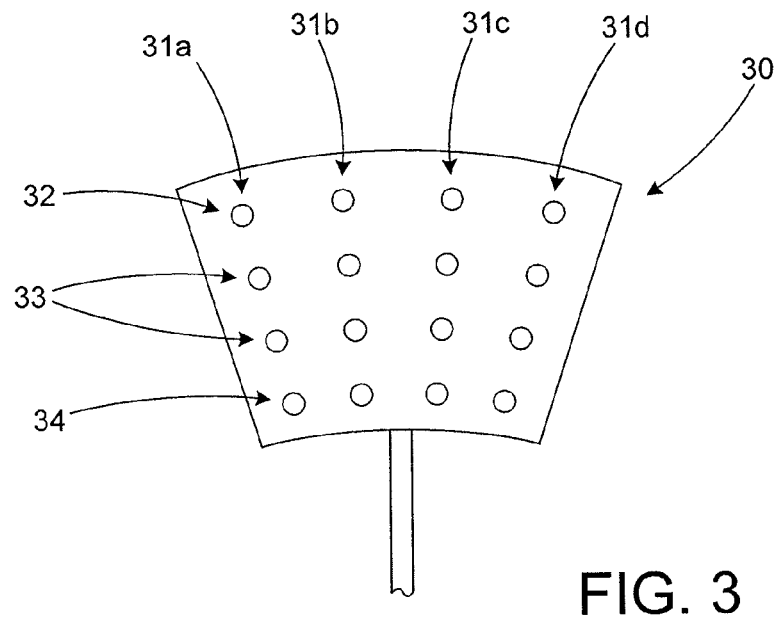
FIG. 3 illustrates another exemplary signaling unit.

FIGS. 2 and 3 depict exemplary embodiments of signaling units used to teach a student to play a percussive instrument. In the exemplary embodiment of FIG. 2, a signaling unit 20 includes a plurality of horizontal strips 21a, 21b, 21c, and 21d (collectively designated 21) each having eleven light emitting diode (LED) lights. However, any suitable configuration of amount of strips 21, amount of LED lights, types of lamps or lights or other similar devices, or orientation of lights is within the scope of the current invention.

In operation, the LED lights of signaling unit 20 illuminate and warn the student of the proper time to strike an instrument. In one exemplary embodiment, all of the LED lights of a signaling unit 20 are the same color. The outermost lights 22 in a strip 21 blink the tempo of the beat. The inner lights 23 illuminate sequentially from the outermost lights inward to provide the student a warning to prepare to strike (hit) the instrument. Finally, the centermost light 24 illuminates, conveying to the student the appropriate time to strike the instrument. In this exemplary embodiment, each strip conveys the striking time for a different beat, with the topmost strip 21a conveying the first beat to strike on the instrument, the next-lower strip 21b conveying the second beat, strips 21c and 21d conveying the third and fourth beats respectively, and then returning to the topmost strip 21a for the fifth beat in the sequence. In a second exemplary embodiment, three different color LED lights, such as red, yellow, and green, are used for each lighting strip 21. In this embodiment the outermost lights 22 in strip 21 are red and denote tempo. The inner lights 23 are yellow to denote a warning of the approaching time to strike. Finally, the centermost light 24 is green to denote time to strike.

FIG. 3 depicts another exemplary embodiment, wherein signaling unit 30 includes four vertical strips 31a, 31b, 31c, and 31d (collectively designated 31) of four LED lights each. In this embodiment, the topmost light 32 in each strip 31 blinks with the tempo of the beat. The second and third lights 33 illuminate sequentially to warn the student that the time to strike is near. Finally, the bottommost light 34 of a strip 31 illuminates indicating the time to strike. In this embodiment each strip 31 conveys the striking time for a different beat, with the leftmost strip 31a conveying the first beat to strike on the percussive instrument, the next strip to the right 31b conveying the second beat, and so on, returning to the leftmost strip 31a for the fifth beat in the sequence.

The exemplary signaling units 20 and 30 may be such that the initial light in the strip is illuminated, and while that light remains illuminated the next light is illuminated and so on. Alternatively, the displays may be arranged such that all lights are illuminated and the lights are sequentially turned off until all lights of the strip are turned off and the strike signaling light then is illuminated to indicate that the drum should be struck. Further, the lights may illuminate a different color depending on which hand (right or left) is the preferred hand for striking the drum. Signaling can also be accomplished through sound, touch, or any other perceivable signal or information to prepare a user to strike and to inform the user when it is time to strike.

Figure 4:
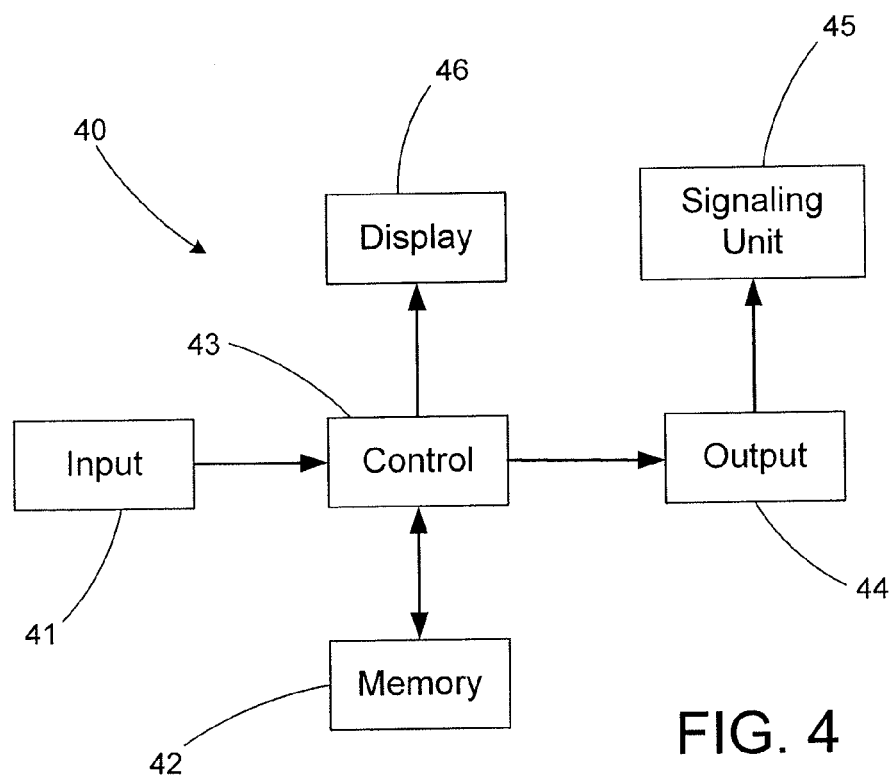
FIG. 4 is a block diagram of an exemplary system embodying the current invention.

FIG. 4 is a block diagram of an exemplary system 40 embodying the current invention. An input 41 to the system 40 can be music from an external source or stored internally in a memory 42. The memory 42 may include, for example, random access memory (RAM), read-only memory (ROM), various forms of programmable and/or erasable (ROM) (e.g., PROM, EPOM, EEPROM, etc.), flash memory, or any combination of such devices. The input 41 can include settings, for example beat, tempo or manner of operation, input through any number of selector mechanisms, examples of which are further described below. The system 40 further includes a control 43, which may contain a CPU, ASIC, or other suitable control circuitry. The memory 42 may contain programming logic to operate the system 40. The system 40 further has an output 44 that includes electronic signals representing tempo, warning to strike, and time to strike, sent to signaling unit 45. The output 44 may also include a signal representing the hand with which the student should strike. For example, information indicating whether the left hand or right hand is to strike a drum may be included having been loaded into the memory 42 together with beat, series of beats, song or other information that leads to providing signals from the control 43 and/or output 44 to operate the signaling unit 45. Exemplary embodiments of signaling unit 45 include 20 and 30 described above. The system 40 may also output information to a display 46 to facilitate user interaction. The system 40 may also output sound or music.

The control 43 further has the capacity to record what is being played on connected instruments, and convert this data into musical notes. The control 43 may also contain a sensor device, such as a microphone, as well as decoding circuitry that may be used to sense music played in real time and determine the notes to express it in a sequence in real time. Further, the music may have an embedded electronic code or signal or an audible sound or signal that can be sensed by a sensor device associated with a signaling unit 45 or independently such as by a microphone. The embedded electronic code or an audible sound or signal can be decoded by decoding circuitry or software within the control 43 to trigger operation of the signaling unit 45. In another exemplary embodiment, a sensor device contained within the signaling unit 45 acts as input 41 and recorded sound is transmitted to the control module 43 for decoding. It is also within the terms of the present invention for control module 43 to be sold with common popular songs, so that the student can play under the computerized signaling sequence while their favorite music is playing. In this embodiment, decoding circuitry or software within the control 43 may recognize beats to trigger the respective signaling unit 45.

Figure 5:
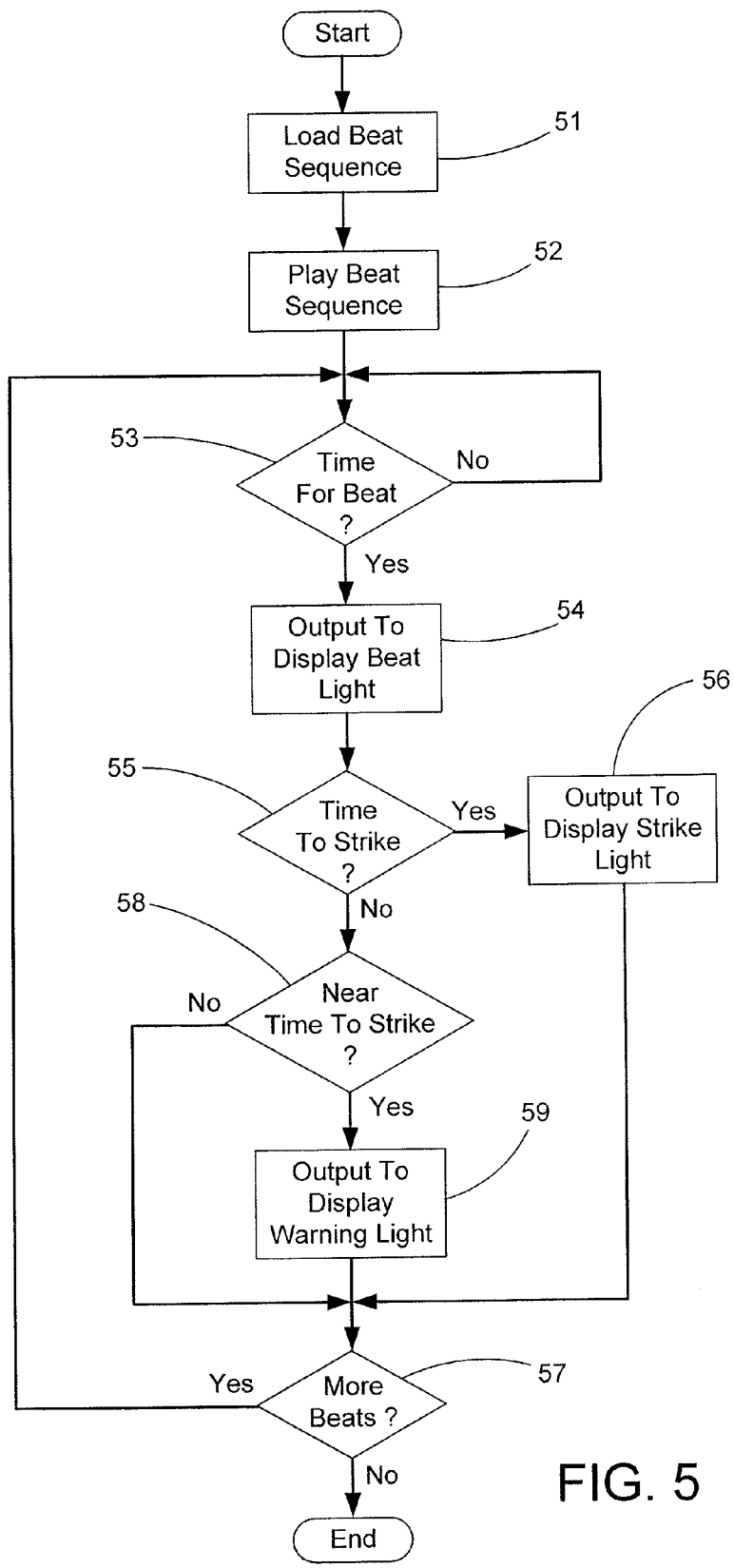
FIG. 5 is a flowchart showing an exemplary signaling process in accordance with the current invention.

FIG. 5 is a flowchart showing a signaling process 50 in accordance with the current invention. At step 51 the control 43 first loads a beat sequence from an external source or from memory 42. In step 52, the control begins to parse the beat sequence in real time. For each time increment, at step 53, the control 43 first determines if that time increment corresponds to the tempo of the beat sequence. If the current time increment corresponds to the tempo of the beat sequence, then an output 51, for example and electrical signal, is generated to the signaling unit 45 indicating the tempo of the beat or the music. The signaling unit 45 will signal the student accordingly, so the student will recognize the beat and coordinate it with striking a percussive instrument. At step 55, the control 43 determines whether it is time to actually strike the drum in accordance with the beat sequence. If it is time to strike, then an output 56 is sent to signaling unit 45 to inform the student that it is time to strike the percussive instrument. At step 57 the control 45 moves to the next increment in time and continues to parse the beat at step 52. If at step 55 it is not actually time to strike, then at step 58 the control 43 determines whether the time to strike the drum in accordance with the beat sequence is approaching. If the time to strike is near, then an output 59 is sent to a signaling unit 45 to indicate to the student that the moment to strike the drum is approaching. The output 59 may further indicate the preferred hand with which the student should strike the drum. Finally, at step 57 the control 45 moves to the next increment in time and continues to parse the beat at step 52 until the beat sequence has ended.

Figure 6:
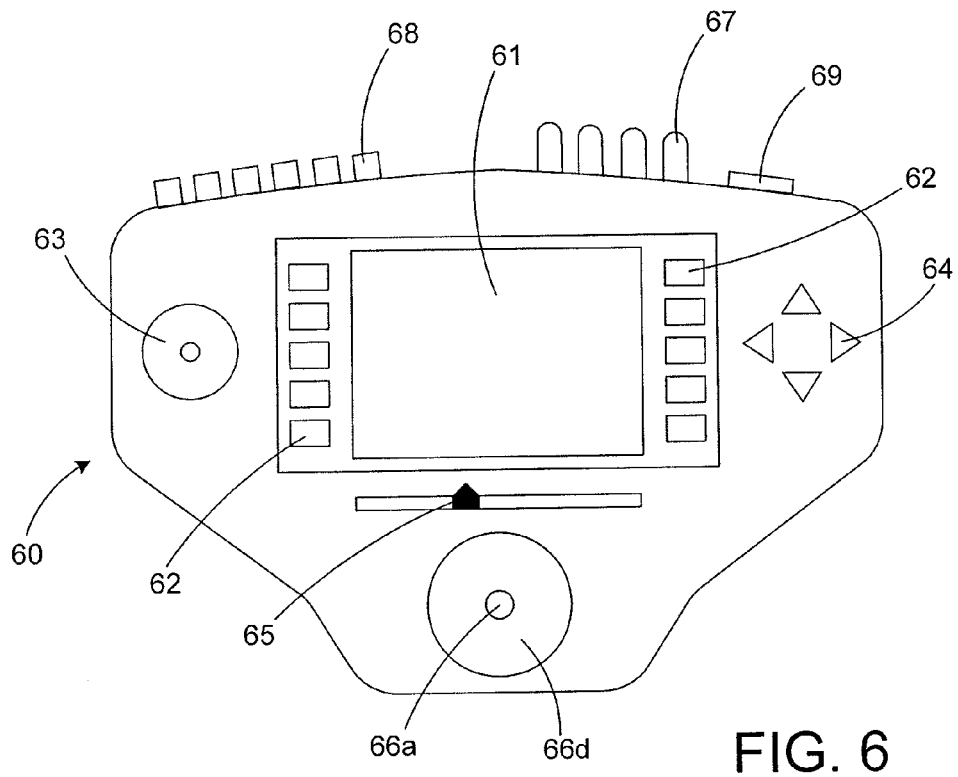
FIG. 6 illustrates an exemplary control.

FIG. 6 depicts an exemplary embodiment of a control that regulates the timing of signaling unit, such as 12, 20, 30, or 45, and acts to coordinate the music with the signal so the student knows the appropriate time to strike. The exemplary control module 60 may comprise a plurality of knobs, buttons, sliders, or other input mechanisms facilitating user interactivity. In one exemplary embodiment, the control module 60 contains a monitor 61 for displaying interactive menus, instructional videos, drum patterns, or other visual outputs. The control module 60 further contains buttons 62 that allow a user to select beats, music, or videos, to stop and start recording and playback, and to skip forward and backward during a song. The control module 60's functions also can be controlled through other inputs such as a joystick 63 or directional pad 64. In another embodiment, playback or tempo is controlled by a slider 65 near the monitor 61. In yet another embodiment, playback and tempo are controlled by a set of knobs 66a and 66b (collectively designated 66) allowing fine or coarse adjustment. The control module 60 may also contain additional knobs 68 that adjust circuitry or software in the control 60 for mixing channel input volumes for a plurality of connected displays or recording devices. Displays and recording devices may be connected by wire to the control through a channel port 69. It is also within the terms of this invention for displays, signaling units, and other devices to connect wirelessly to the control module 60 through, for example, Bluetooth, the wireless communications protocol described in the 802.11a, b, g or n standards, or in any other wireless communications protocol.

The control module 60 can be controlled by a computer to which it is attached via an interface 70 such as USB or the like. It is also within the terms of the invention for the control module 60 to be self-contained. The control module 60 may be programmed with beats. It is also designed to allow the user to program original beats.

Figure 7:
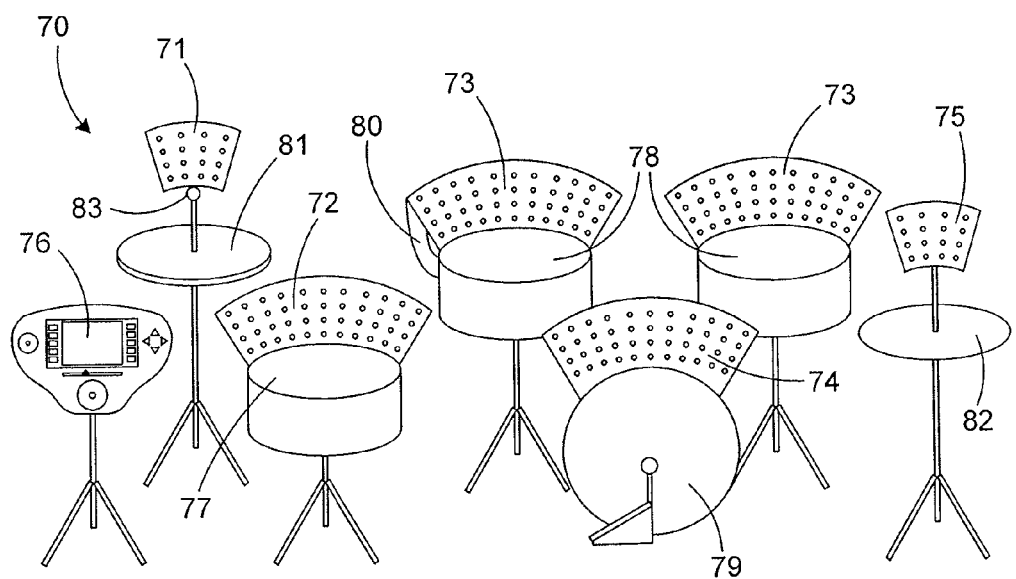
FIG. 7 is an exemplary schematic view of a drum kit utilizing the current invention.

FIG. 7 illustrates an exemplary full view of a drum kit 70 with associated signaling units 71, 72, 73, 74 and 75 and control module 76. Signaling units 72, 73, and 74 are each attached to the rim of respective drums 77, 78 and 79 by a clip 80, or any other suitable mechanism. In one embodiment the clip 80 has a "c" shape and is made of a flexible material for fitting around the head of a drum such as 77, 78 or 79. Signaling units 71 and 75 are attached to the support stands of respective cymbals 81 and 82 by clip 83, or any other suitable mechanism. It is also possible to attach a signaling unit to other percussive accessories, such as a tambourine or cowbell (not shown).

Computer program elements of the invention may be embodied in hardware and/or in software (including firmware, resident software, micro-code, etc.). The invention may take the form of a computer program product, which can be embodied by a computer-usable or computer-readable storage medium having computer-usable or computer-readable program instructions, "code" or a "computer program" embodied in the medium for use by or in connection with the instruction execution system. In the context of this document, a computer-usable or computer-readable medium may be any medium that can contain, store, communicate, propagate, or transport the program for use by or in connection with the instruction execution system, apparatus, or device. The computer-usable or computer-readable medium may be, for example but not limited to, an electronic, magnetic, optical, electromagnetic, infrared, or semiconductor system, apparatus, device, or propagation medium such as the Internet. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner. The computer program product and any software and hardware described herein form the various means for carrying out the functions of the invention in the example embodiments.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

I claim:

1. A system for facilitating playing of a percussion instrument comprising:
    a signaling unit configured to indicate a beat and a timing for applying an input to the percussion instrument, and
    a control configured to operate the signaling unit to indicate said timing and said beat, wherein the signaling unit comprises a plurality of indicators sequentially arranged in a row or column;
wherein a first indicator of said sequential arrangement is operable to indicate the beat;
wherein a second indicator of said sequential arrangement is operable to indicate the timing preceding a time to apply the input; and
wherein a third indicator of said sequential arrangement is operable to indicate the time to apply the input.

2. The system of claim 1, further comprising a plurality of signaling units being operable by said control, wherein each of said plurality of signaling units is capable of corresponding with a different percussion instrument.

3. The system of claim 1, said control comprising:
a display for displaying music and instructive videos, and for allowing user interactivity with said control,
a plurality of selectors facilitating user interactivity,
a sensing or recording device,
a memory, and
an input/output.

4. The system of claim 1, wherein said sequential arrangement is a first sequential arrangement, said signaling unit being configured to indicate a second beat and timing for applying a second input to the percussion instrument,
wherein said signaling unit further comprises a second plurality of indicators sequentially arranged in a row or column;
wherein a first indicator of said second sequential arrangement is operable to indicate the second beat;
wherein a second indicator of said second sequential arrangement is operable to indicate the timing preceding a time to apply the second input; and
wherein a third indicator of said second sequential arrangement is operable to indicate the time to apply the second input.

5. The system of claim 1, said signaling unit further comprising a trigger, sensor, or other input for sensing a percussive strike.

6. A system facilitating playing of an instrument comprising:
a signaling unit configured to indicate timing for applying an input to the instrument, wherein said input comprises striking a percussion instrument,
a control configured to operate the signaling unit to indicate such timing according to a beat, and
the signaling unit comprising an indicator operable in response to the control to provide indications of both time to apply the input and a warning preceding time to apply the input,
said signaling unit further comprising a flexible material for bending around the rim of drum and 'C'-shaped bottom member facilitating a secure fit to a drumhead.

7. The system of claim 1 wherein said control is connected to a general purpose computer.

8. The system of claim 2, said plurality of signaling units being connected to said control through a wireless connection.

9. A method for teaching the playing of a percussion instrument comprising the steps of:
providing a signaling unit configured to indicate a beat and a timing for applying an input to the percussion instrument, said signaling unit comprising a plurality of indicators sequentially arranged in a row or column;
generating a first output to a first indicator of said sequential arrangement for indicating the beat,
generating a second output to a second indicator of said sequential arrangement for indicating the timing preceding a time to apply the input to the percussion instrument; and
generating a third output to a third indicator of said sequential arrangement for indicating the time to apply the input to the percussion instrument.

10. The method of claim 9, comprising:
sensing a percussive strike,
decoding the sound of said strike via decoding circuitry,
storing said sound into a sequence of beats in a memory, and
playing back said sequence of beats from said memory.

11. The method of claim 9 wherein said first, second, and third outputs are sent to a plurality of signaling units.

12. The method of claim 11, each of said plurality of signaling units:
sensing a percussive strike,
decoding the sound of said strike via decoding circuitry,
storing said sound into a sequence of beats in a memory, and
playing back said sequence of beats from said memory.

13. The method of claim 11, said second output further indicating the preferred hand with which to strike.

* * * * *